(12) United States Patent
Kim et al.

(10) Patent No.: US 12,470,833 B2
(45) Date of Patent: Nov. 11, 2025

(54) DEVICE FOR CORRECTING ARTIFACTS INCLUDED IN IMAGES

(71) Applicant: SK hynix Inc., Icheon-si (KR)

(72) Inventors: Jin Su Kim, Icheon-si (KR); Tae Hyun Kim, Icheon-si (KR); Jong Hyun Bae, Icheon-si (KR); Sang Woo Ahn, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 187 days.

(21) Appl. No.: 18/347,420

(22) Filed: Jul. 5, 2023

(65) Prior Publication Data

US 2024/0236505 A1    Jul. 11, 2024

(30) Foreign Application Priority Data

Jan. 11, 2023 (KR) .......................... 10-2023-0004026

(51) Int. Cl.
*H04N 23/81* (2023.01)
*H04N 23/84* (2023.01)

(52) U.S. Cl.
CPC ........... *H04N 23/81* (2023.01); *H04N 23/843* (2023.01)

(58) Field of Classification Search
CPC ...... H04N 23/81; H04N 23/843; H04N 23/82; H04N 23/84; H04N 23/672; H04N 23/80; H04N 23/60; G06T 5/70; G06T 5/20; G06T 2207/20024; G06T 5/00; G06T 5/50; G06T 5/73
See application file for complete search history.

(56) References Cited

U.S. PATENT DOCUMENTS

| | | | | |
|---|---|---|---|---|
| 8,436,925 B2* | 5/2013 | Hirota | ...................... | H04N 9/77 348/279 |
| 10,334,189 B1* | 6/2019 | Xu | ........................ | H04N 25/778 |
| 11,394,880 B2 | 7/2022 | Han | | |
| 2010/0097491 A1* | 4/2010 | Farina | .................. | H04N 23/843 348/223.1 |
| 2015/0130948 A1* | 5/2015 | Cogliati | .................. | G01T 1/244 250/370.08 |
| 2015/0312442 A1* | 10/2015 | Higashi | ................ | H04N 19/182 382/266 |
| 2020/0410211 A1* | 12/2020 | Lai | ........................ | G06V 10/443 |

FOREIGN PATENT DOCUMENTS

KR    1020220053067 A    4/2022

* cited by examiner

*Primary Examiner* — Albert H Cutler
(74) *Attorney, Agent, or Firm* — WILLIAM PARK AND ASSOCIATES LTD.

(57) ABSTRACT

A device for correcting artifacts included in images includes an image processor. The image processor includes an acquirer configured to acquire image data including first pixel data, second pixel data, third pixel data, and fourth pixel data arranged in a 2×2 array. The image processor also includes a guide image generator configured to acquire a first guide image based on an average value of the first pixel data and the fourth pixel data that are located in a diagonal direction. The image processor further includes an image operating component configured to output a result image generated using a high-frequency component, included in the first guide image, and the image data.

16 Claims, 8 Drawing Sheets

(710)  (720)

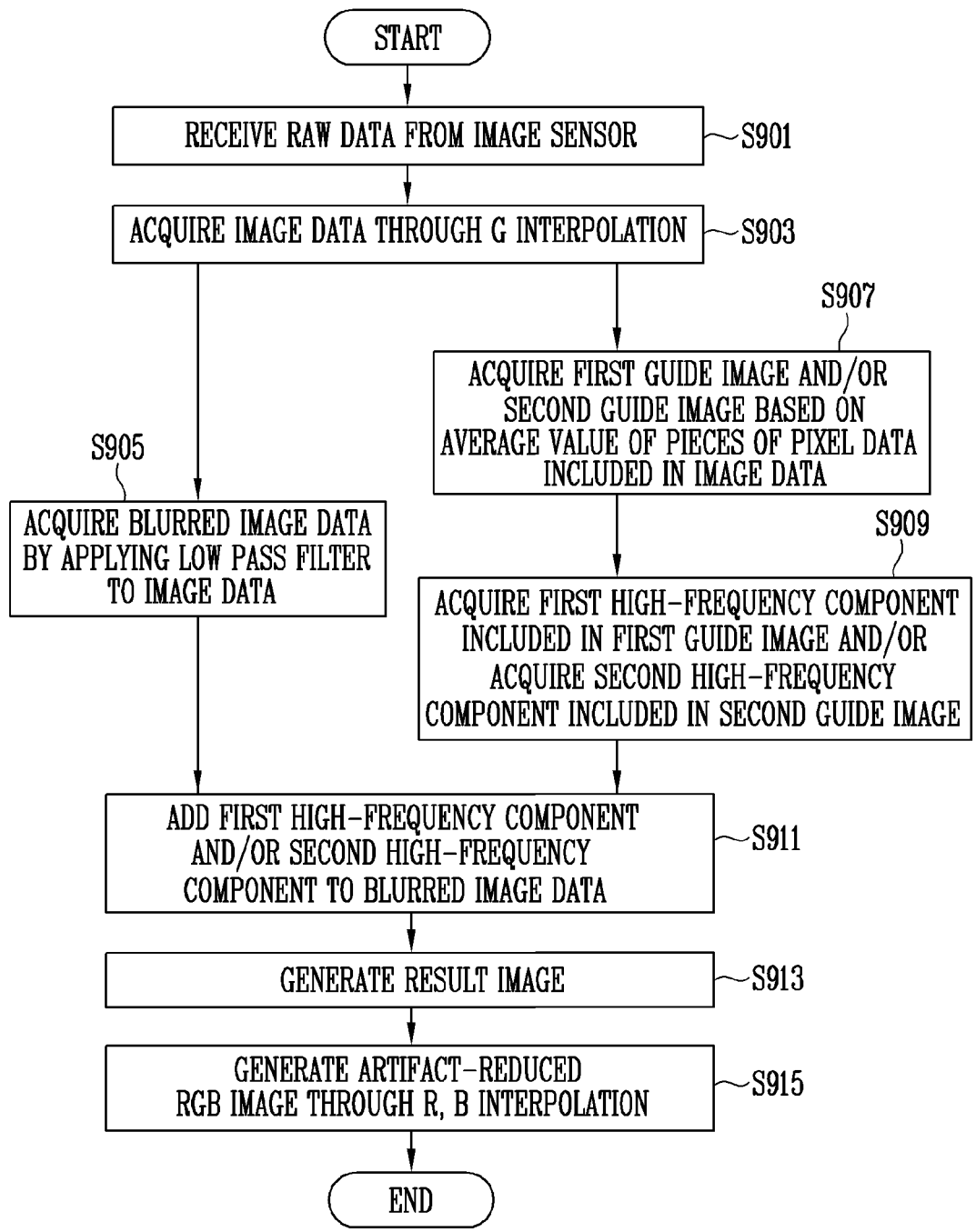

DEVICE FOR CORRECTING ARTIFACTS INCLUDED IN IMAGES

CROSS-REFERENCE TO RELATED APPLICATION

The present application claims priority under 35 U.S.C. § 119(a) to Korean patent application number 10-2023-0004026 filed on Jan. 11, 2023, in the Korean Intellectual Property Office, the entire disclosure of which is incorporated by reference herein.

BACKGROUND

1. Technical Field

Various embodiments of the present disclosure generally relate to technology for correcting artifacts included in images through image processing.

2. Related Art

Recently, as the size of a pixel is reduced in response to a requirement for a high-pixel image sensor, an image sensor having a form in which two or more photodiodes (hereinafter referred to as "PD") are arranged below one micro-lens has been developed. For example, an image sensor may be configured not only such that each pixel includes one micro-lens, but also such that four pixels arranged in a 2×2 array share one micro-lens with each other. The image sensor in which four pixels share one micro-lens with each other may be referred to as an "all 4-coupled sensor" (hereinafter referred to as "A4C").

An image captured through an image sensor in which two or more pixels share one micro-lens with each other may include artifacts attributable to a phase difference. For example, an image captured through the A4C sensor includes artifacts attributable to a phase difference occurring in an area in which a focus is not established.

Light passing through one micro-lens in the A4C sensor is incident on two or more (e.g., four) pixels with the light being divided into the pixels. Therefore, a device including the A4C sensor acquires an image in which a phase different does not occur in light incident from a first subject being in focus in a capturing scene, but a phase difference occurs in light incident from a second subject being out of focus.

SUMMARY

In accordance with an embodiment of the present disclosure is an image processor. The image processor may include: an acquirer configured to acquire image data including first pixel data, second pixel data, third pixel data, and fourth pixel data arranged in a 2×2 array; a guide image generator configured to acquire a first guide image based on an average value of the first pixel data and the fourth pixel data that are located in a diagonal direction; and an image operating component configured to output a result image generated using a high-frequency component, included in the first guide image, and the image data.

In accordance with an embodiment of the present disclosure is an image processing method. The image processing method may include: acquiring image data including first pixel data, second pixel data, third pixel data, and fourth pixel data arranged in a 2×2 array; acquiring a first guide image based on an average value of the first pixel data and the fourth pixel data that are located in a diagonal direction; and generating a result image using a high-frequency component, included in the first guide image, and the image data.

BRIEF DESCRIPTION OF THE DRAWINGS

FIG. 9 is a flowchart illustrating a detailed method of acquiring an artifact-reduced result image according to an embodiment of the present disclosure.

DETAILED DESCRIPTION

Specific structural or functional descriptions in the embodiments of the present disclosure introduced in this specification or application are only for description of the embodiments of the present disclosure. The descriptions should not be construed as being limited to the embodiments described in the specification or application.

Various embodiments of the present disclosure will now be described in detail with reference to the accompanying drawings so that those skilled in the art can practice the technical spirit of the present disclosure.

Figure 1:
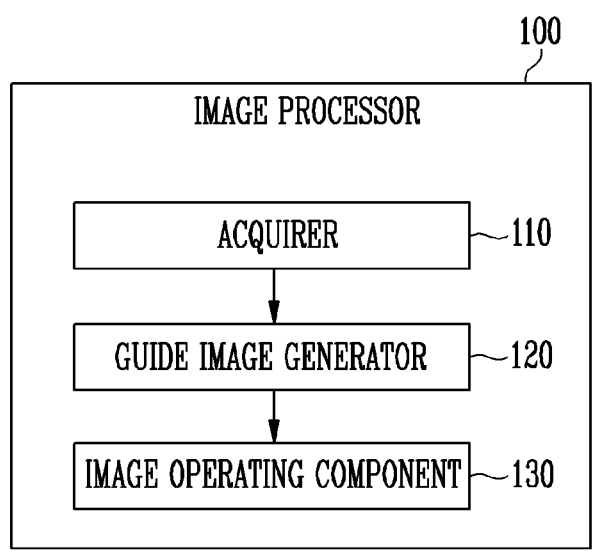
FIG. 1 is a diagram schematically illustrating the configuration of an image processor according to an embodiment of the present disclosure.

FIG. 1 is a diagram schematically illustrating the configuration of an image processor according to an embodiment of the present disclosure.

Referring to FIG. 1, an image processor 100 may include an acquirer 110, a guide image generator 120, and an image operating component 130.

The acquirer 110 may acquire image data including first pixel data, second pixel data, third pixel data, and fourth pixel data, which are arranged in a 2×2 array. The image data will be described in detail later with reference to FIG. 2.

The guide image generator 120 may acquire a first guide image based on the average value of the first pixel data and the fourth pixel data that are located in a diagonal direction. The guide image generator 120 may acquire a second guide image based on the average value of the second pixel data and the third pixel data that are located in a diagonal direction. The guide images will be described in detail later with reference to FIGS. 4 and 5.

The image operating component 130 may generate an image in which artifacts are reduced compared to the image data using a high-frequency component included in the first guide image. The image operating component 130 may output the generated artifact-reduced image. The generation of the artifact-reduced image will be described in detail later with reference to FIG. 6. In the present disclosure, the artifact-reduced image may be referred to as a "result image."

The image operating component 130 may generate the artifact-reduced image using at least one of a first high-frequency component included in the first guide image or a second high-frequency component included in the second guide image. For example, the image operating component 130 may generate the artifact-reduced image depending on a first weight related to the first guide image and a second weight related to the second guide image. The weights will be described in detail later with reference to FIG. 6.

Figure 2:
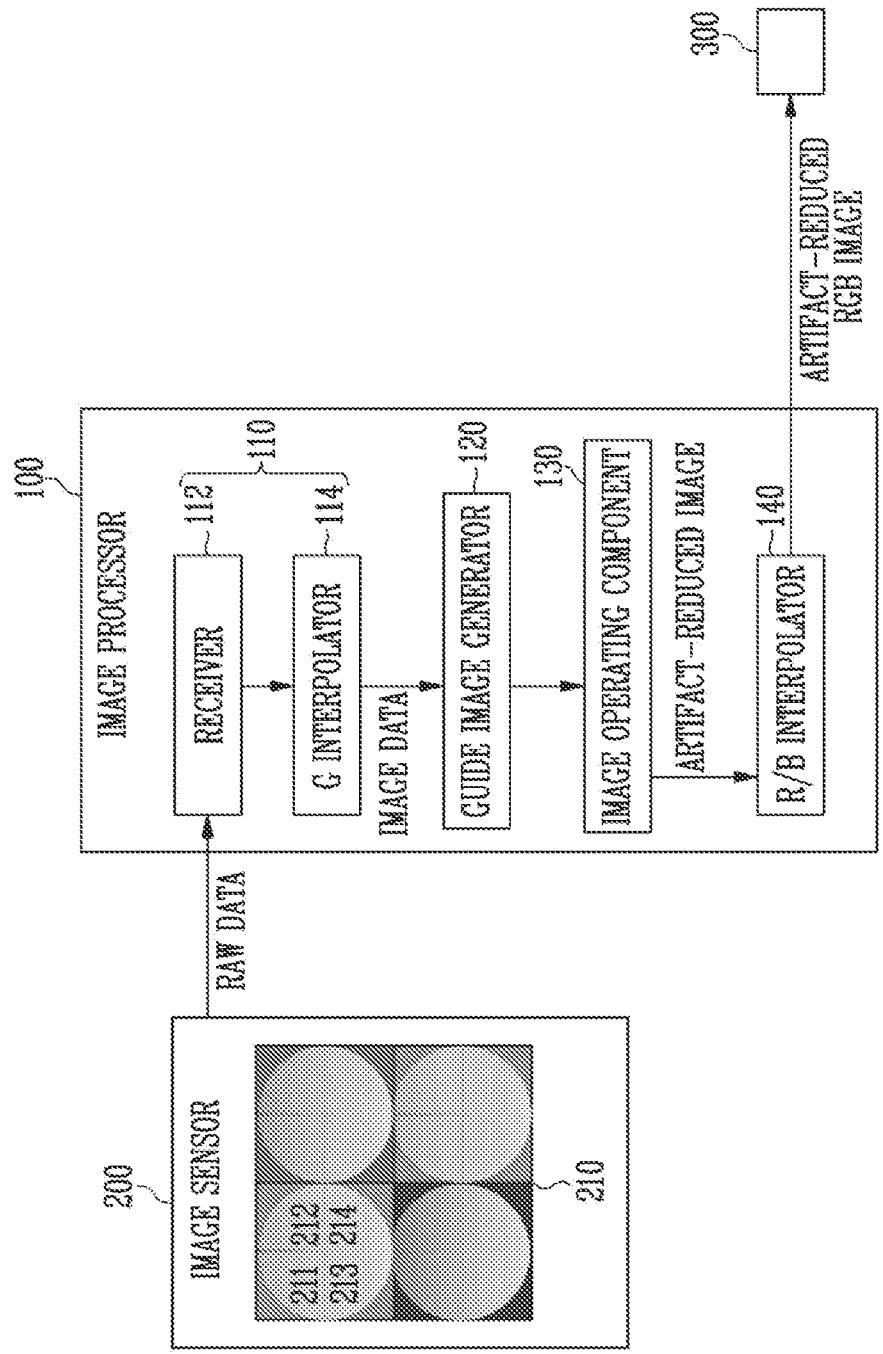
FIG. 2 is a diagram schematically illustrating the configuration of an image processor and an image sensor according to an embodiment of the present disclosure.

FIG. 2 is a diagram schematically illustrating the configuration of an image processor and an image sensor according to an embodiment of the present disclosure. In relation to FIG. 2, components described in FIG. 1 and additional components will be described in detail.

Referring to FIG. 2, the image processor 100 may include a receiver 112, a G interpolator 114, a guide image generator 120, an image operating component 130, and an R/B interpolator 140. The receiver 112 and the G interpolator 114 illustrated in FIG. 2 may be included in the acquirer 110 of FIG. 1. Further, the image processor 100 may receive raw data from the image sensor 200 through the receiver 112. The image processor 100 may output an artifact-reduced RGB image to an external module 300.

The image sensor 200 may acquire the raw data through the pixel array 210. The pixel array 210 may be configured such that two or more pixels share one micro-lens with each other. For example, the pixel array 210 may include a first pixel 211, a second pixel 212, a third pixel 213, and a fourth pixel 214, which are arranged in a 2×2 array. The first pixel 211, the second pixel 212, the third pixel 213, and the fourth pixel 214 may have color filters corresponding to the same color (e.g., green (G)). Furthermore, the first pixel 211, the second pixel 212, the third pixel 213, and the fourth pixel 214 may share one micro-lens with each other. In the present disclosure, the two or more pixels (e.g., the first pixel 211, the second pixel 212, the third pixel 213, and the fourth pixel 214) which share one micro-lens with each other may be designated as being included in one unit pixel.

The raw data captured through the image sensor 200 in which two or more pixels share one micro-lens with each other may include artifacts attributable to a phase difference. For example, the raw data acquired through the image sensor 200 may include artifacts attributable to a phase difference occurring in an area in which a focus is not established. Of light incident on the image sensor 200, light passing through one micro-lens may be incident on the four pixels, with the light being divided into the four pixels (e.g., the first pixel 211, the second pixel 212, the third pixel 213, and the fourth pixel 214). Therefore, the image sensor 200 may acquire raw data in which a phase difference does not occur in light incident from a first subject being in focus in a capturing scene, but a phase difference occurs in light incident from a second subject being out of focus.

The image sensor 200 may output the raw data. The raw data may include pixel values acquired through the pixel array 210. The raw data may include pixel values corresponding to two or more colors. For example, the raw data may include a pixel value corresponding to a green (G) color, a pixel value corresponding to a red (R) color, and a pixel value corresponding to a blue (B) color.

The image processor 100 may receive the raw data from the image sensor 200 through the receiver 112. The receiver 112 may provide the raw data to the G interpolator 114.

The G interpolator 114 may perform G interpolation on the raw data. For example, the G interpolator 114 may perform interpolation so that, among the pixel values included in the raw data, pixel values corresponding to color R and color B correspond to color G. Interpolation performed by the G interpolator 114 will be described in detail later with reference to FIG. 3.

The G interpolator 114 may acquire image data interpolated to be color G. In the present disclosure, the image data may refer to data on which G interpolation is performed based on the raw data. Therefore, pixel data (e.g., first pixel data, second pixel data, third pixel data, and fourth pixel data) included in the image data may correspond to color G. Furthermore, because the G interpolator 114 acquires the image data based on the raw data including artifacts attributable to a phase difference, the image data may also include the artifacts attributable to the phase difference.

The guide image generator 120 may acquire a first guide image and/or a second guide image based on the image data. The guide images will be described in detail later with reference to FIGS. 4 and 5.

The image operating component 130 may acquire an image in which artifacts are reduced compared to the image data based on the guide images. The image operating component 130 may provide the artifact-reduced image to the R/B interpolator 140. The artifact-reduced image may refer to an image in which artifacts attributable to a phase difference included in at least a partial area of the raw data or the image data are reduced. In the present disclosure, the artifact-reduced image may be referred to as a "result image." That is, the result image in the present disclosure may correspond to the artifact-reduced image of FIG. 2. The artifact-reduced image will be described in detail later with reference to FIG. 6.

The R/B interpolator 140 may perform R interpolation and B interpolation on the artifact-reduced image. Because the guide image generator 120 and the image operating component 130 generate the artifact-reduced image based on the image data interpolated to be color G, the artifact-reduced image may correspond to color G. Therefore, the R/B interpolator 140 may perform R interpolation or B interpolation on some of pixel values included in the artifact-reduced image. For example, the R/B interpolator 140 may interpolate some pixel values, which correspond to color R (or color B) before G interpolation is performed, among the pixel values included in the artifact-reduced image so that some pixel values correspond to color R (or color B).

The R/B interpolator 140 may convert pixel values in color G back into pixel values in color R (or color B) using ratios before and after color R (or color B) is converted into color G by the G interpolator 114. For example, the R/B interpolator 140 may convert each pixel value in color G included in the artifact-reduced image into a pixel value in color R (or color B) by multiplying a ratio of R/G (or a ratio of B/G) by the pixel value in color G.

The image processor 100 may acquire the artifact-reduced RGB image through the R/B interpolator 140. The image processor 100 may output the artifact-reduced RGB image to the external module 300. For example, the external module 300 may be an application processor, a memory device, or a display. In addition, the external module 300 may be any of various parts or devices to which the image processor 100 is capable of outputting the artifact-reduced RGB image.

Figure 3:
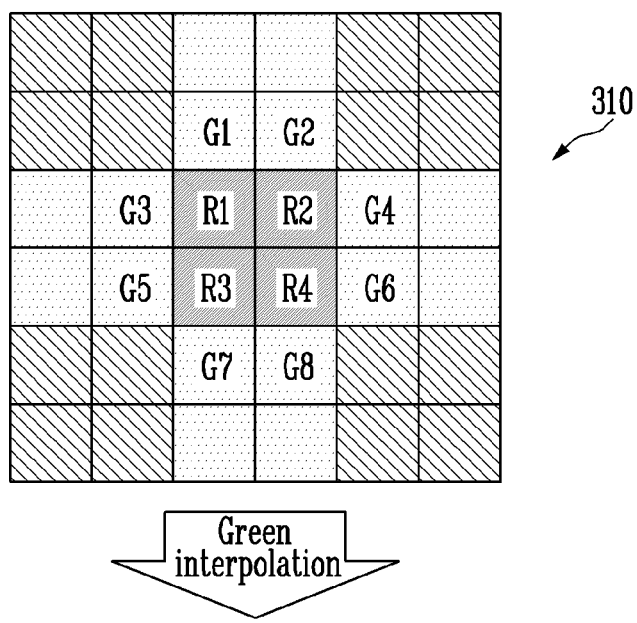
FIG. 3 is a diagram illustrating an example of a method in which an image processor performs G interpolation according to an embodiment of the present disclosure.
Figure 3:
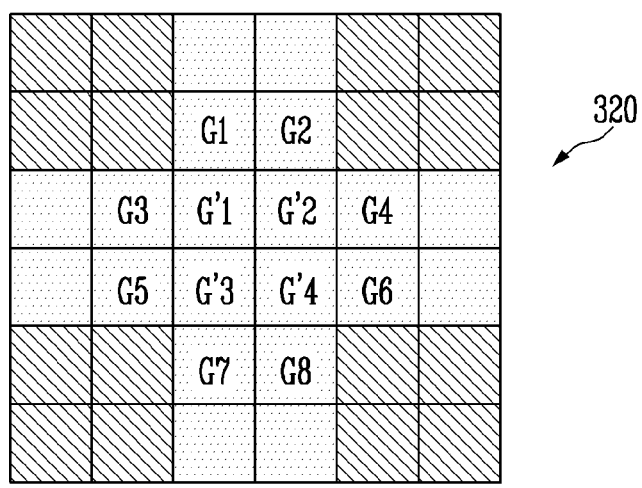

FIG. 3 is a diagram illustrating an example of a method in which an image processor performs G interpolation according to an embodiment of the present disclosure. It may be understood that G interpolation to be described in FIG. 3 is performed by the G interpolator 114 of FIG. 2.

The G interpolator 114 may interpolate pixel values corresponding to color R or color B, among pixel values included in raw data 310, to be color G. For example, the G interpolator 114 may covert a first pixel value R1, a second pixel value R2, a third pixel value R3, and a fourth pixel value R4, which correspond to color R, among the pixel values included in the raw data 310, into color G, and may then acquire first pixel data G'1, second pixel data G'2, third pixel data G'3, and fourth pixel data G'4, which correspond to color G.

The G interpolator 114 may perform G interpolation using the color ratio of a local area. For example, the G interpolator 114 may convert the first pixel value R1 corresponding to color R into the first pixel data G'1 corresponding to color G using the following Equation 1:

$$G'1 = R1 * \frac{\text{average }(G1, G2, G3, G4, G5, G6, G7, G8)}{\text{average }(R1, R2, R3, R4)} \quad (1)$$

Referring to Equation 1, the G interpolator 114 may calculate the ratio of color G to color R based on pixel values located around the first pixel value R1 that is the target of interpolation, and may acquire the first pixel data G'1 corresponding to color G by multiplying the first pixel value R1 by the calculated ratio. In Equation 1, average may denote an average operation.

Alternatively, the G interpolator 114 may perform G interpolation using various schemes in addition to the color ratio of a local area. For example, the G interpolator 114 may perform G interpolation on the raw data 310 using linear interpolation, polynomial curve fitting, or the like.

Reference numeral 320 shows the state in which G interpolation is performed on the pixel values R1, R2, R3, and R4 corresponding to color R, among the pixel values included in the raw data 310. The G interpolator 114 may also perform G interpolation on pixel values corresponding to color B, as well as the pixel values R1, R2, R3, and R4 corresponding to color R, among the pixel values included in the raw data 310. The G interpolator 114 may interpolate the pixel values corresponding to color R and/or color B, which are included in the raw data 310, to be color G, and then acquire image data (not illustrated).

Further, although, in the present disclosure, description has been made on the assumption that the image processor 100 interpolates the raw data 310 to be color G, this is only an example, and the scope of the present disclosure is not limited thereto. For example, the present disclosure may also be applied to the case where the image processor 100 interpolates the raw data to be color R, color B, or an additional color to acquire image data, instead of interpolating the raw data to be color G.

Figure 4:
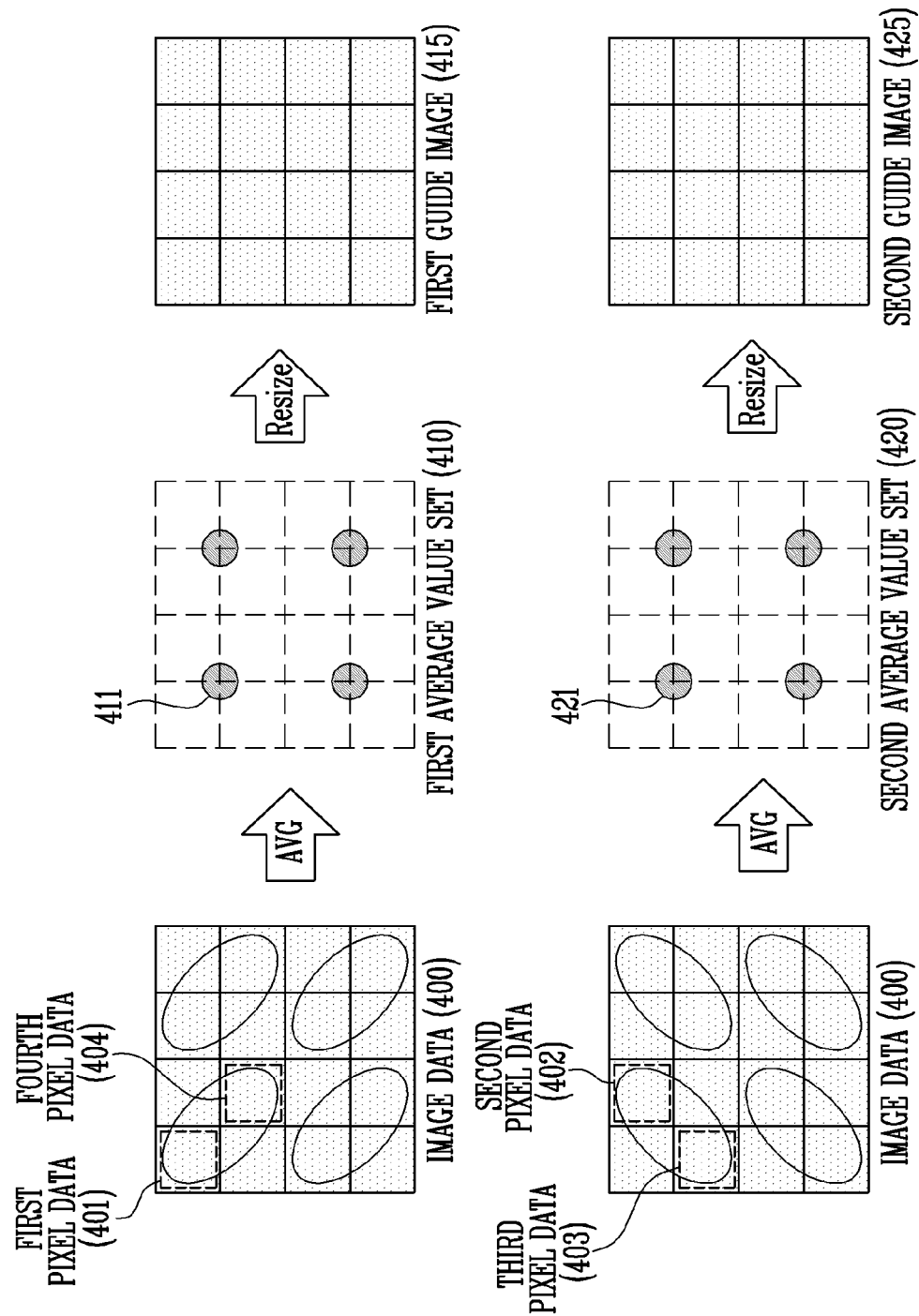
FIG. 4 is a diagram illustrating a method in which an image processor acquires guide images based on image data according to an embodiment of the present disclosure.

FIG. 4 is a diagram illustrating a method in which an image processor acquires guide images based on image data according to an embodiment of the present disclosure.

Referring to FIG. 4, image data 400 may include first pixel data 401, second pixel data 402, third pixel data 403, and fourth pixel data 404, which are arranged in a 2×2 array.

The image data 400 may refer to data on which G interpolation is performed based on raw data 310. The first pixel data 401, the second pixel data 402, the third pixel data 403, and the fourth pixel data 404 may be either pixel values corresponding to color G, which are included in the raw data 310, or values obtained by interpolating the pixel values corresponding to color R (or color B), which are included in the raw data 310, to be color G. Furthermore, the first pixel data 401, the second pixel data 402, the third pixel data 403, and the fourth pixel data 404 may be pieces of pixel data which share one micro-lens with each other and are acquired through one unit pixel.

The guide image generator 120 may acquire a first guide image 415 based on the average value 411 of the first pixel data 401 and the fourth pixel data 404 that are located in a diagonal direction. For example, the guide image generator 120 may acquire a first average value set 410 including the average value 411 of the first pixel data 401 and the fourth pixel data 404, based on the image data 400. The guide image generator 120 may acquire the first guide image 415 having resolution higher than that of the first average value set 410 using the first average value set 410. A method in which the guide image generator 120 acquires the first guide image 415 using the first average value set 410 will be described in detail later with reference to FIG. 5.

The guide image generator 120 may acquire a second guide image 425 based on the average value 421 of the second pixel data 402 and the third pixel data 403 that are located in a diagonal direction. For example, the guide image generator 120 may acquire a second average value set 420 including the average value 421 of the second pixel data 402 and the third pixel data 403, based on the image data 400. The guide image generator 120 may acquire the second guide image 425 having resolution higher than that of the second average value set 420 using the second average value set 420.

Referring to FIG. 4, the guide image generator 120 may calculate the average of pieces of pixel data acquired from the pixels located in a diagonal direction within a unit pixel. The guide image generator 120 may acquire guide images (e.g., the first guide image 415 or the second guide image 425) using light incident on two pixels located in a diagonal direction among lights incident on four pixels after passing through one micro-lens.

The guide image generator 120 may reduce artifacts attributable to a phase difference included in the image data 400 by calculating the average of pieces of pixel data (e.g., the first pixel data 401 and the fourth pixel data 404 or the second pixel data 402 and the third pixel data 403) located in a diagonal direction within a unit pixel. As the guide image generator 120 acquires the first average value set 410 (or the second average value set 420) based on the image data 400, artifacts attributable to the phase difference included in the image data 400 may be removed. The artifacts included in the image data 400 may result from the phase difference occurring in a row direction and a column direction because light passing through one micro-lens is divided into four pixels arranged in a 2×2 array. However, when the guide image generator 120 calculates the average of pieces of pixel data in a diagonal direction, included in the image data 400, a phase difference in a row direction and a phase difference in a column direction are offset, and thus artifacts attributable to the phase difference, included in the image data 400, may be removed.

The image processor 100 may generate an image in which artifacts are reduced compared to the image data 400, using high-frequency components included in the guide images (e.g., the first guide image 415 and the second guide image 425) acquired by the guide image generator 120. However, for the image processor 100 to generate the artifact-reduced image using the high-frequency components included in the guide images, the resolutions of the image data 400 and the guide images (e.g., the first guide image 415 and the second guide image 425) need to match each other.

Figure 5:
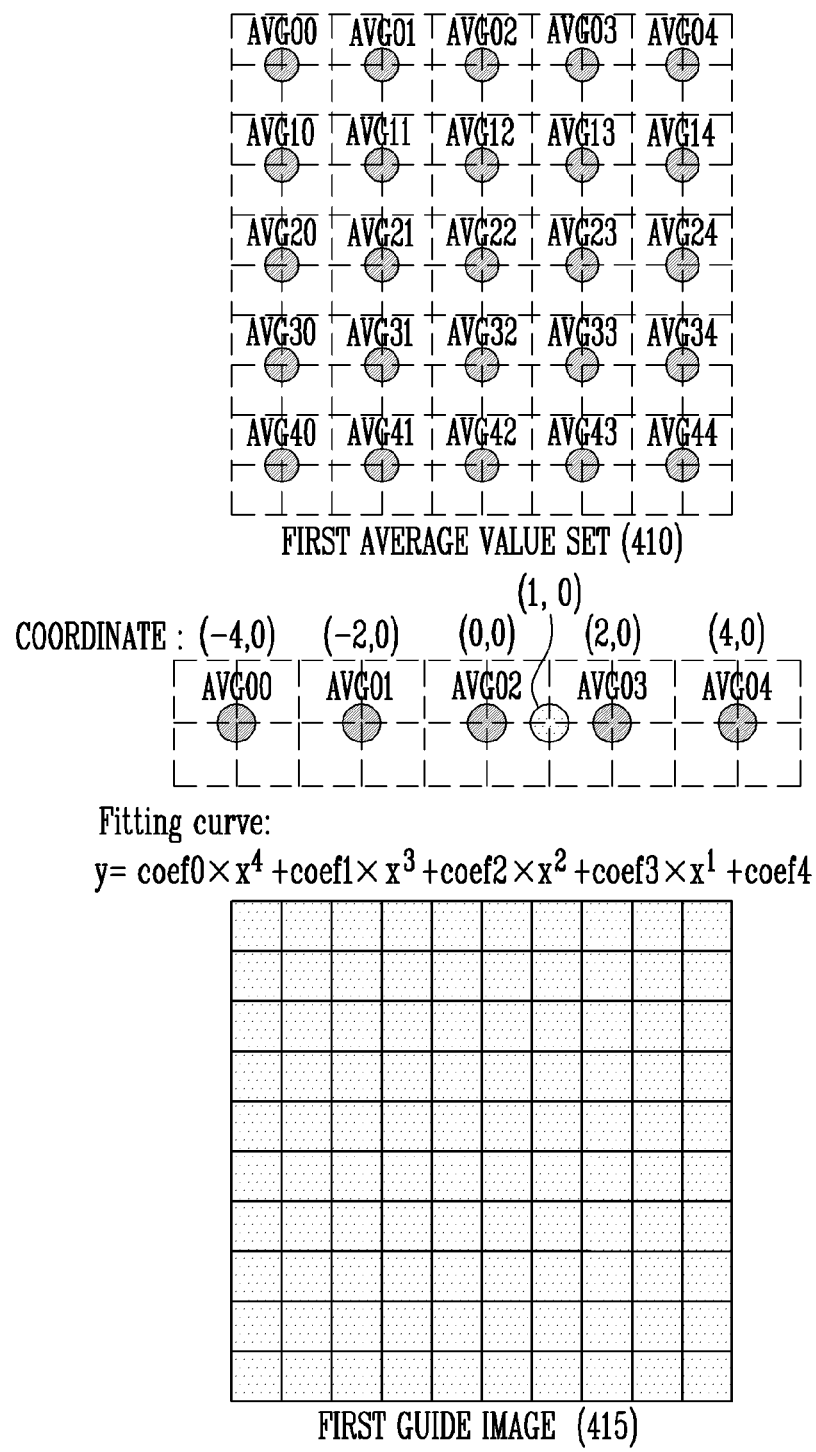
FIG. 5 is a diagram illustrating a detailed method in which an image processor acquires a guide image according to an embodiment of the present disclosure.

However, the average value sets (e.g., the first average value set 410 and the second average value set 420) acquired through average calculation may have resolution that is ¼ of that of the image data 400. For example, the horizontal length and the vertical length of each average value set may be ½ of the horizontal length and the vertical length of the image data 400. Therefore, the guide image generator 120 may acquire the guide images (e.g., the first guide image 415 and the second guide image 425) corresponding to the size of the image data 400 by resizing the average value sets (e.g., the first average value set 410 and the second average value set 420). In FIG. 5, an example of a method in which the guide image generator 120 acquires guide images (e.g., the first guide image 415 and the second guide image 425) by resizing the average value sets (e.g., the first average value set 410 and the second average value set 420) will be described.

FIG. 5 is a diagram illustrating a detailed method in which an image processor acquires a guide image according to an embodiment of the present disclosure.

Referring to FIG. 5, a guide image generator 120 may acquire a first guide image 415 by resizing a first average value set 410. For example, the guide image generator 120 may acquire the first guide image 415 having resolution higher than that of the first average value set 410 using the first average value set 410. The resolution of the first guide image 415 may correspond to that of image data 400. Although in FIG. 5, the case where the guide image generator 120 acquires the first guide image 415 based on the first average value set 410 is described, the description of FIG. 5 may also be applied to the case where the guide image generator 120 acquires a second guide image 425 based on a second average value set 420.

Referring to FIG. 5, the first average value set 410 may include average values (e.g., AVG00, AVG01, AVG02, etc.). The average values included in the first average value set 410 may be included in one unit pixel, among pieces of pixel data included in the image data 400, and may be the average value of pieces of pixel data (e. g., first pixel data 401 and fourth pixel data 404) located in a diagonal direction (e.g., a top-left portion and a bottom-right portion). Further, the average values included in the first average value set 410 may be designated as AVGAB, which may indicate the average value located in a A+1-th row and a B+1-th column.

The guide image generator 120 may acquire the first guide image 415 having resolution higher than that of the first average value set 410 using a fitting curve of the first average value set 410.

For example, when description is made based on a first row, the coordinates of AVG00 may be (−4, 0), the coordinates of AVG01 may be (−2, 0), the coordinates of AVG02 may be (0, 0), the coordinates of AVG03 may be (2, 0), and the coordinates of AVG04 may be (4, 0). Equation 2 may correspond to a fitting curve passing through the values AVG00, AVG01, AVG02, AVG03, and AVG04 corresponding to the above-described five coordinates.

$$y = coef0 \times x^4 + coef1 \times x^3 + coef2 \times x^2 + coef3 \times x^1 + coef4 \quad (2)$$

In Equation 2, x may be a coordinate, and y may be a value corresponding to the coordinate (average value). The guide image generator 120 may substitute the average values in the first row into Equation 2 to acquire coefficients coef0, coef1, coef2, coef3, and coef4 of Equation 2. Equation 3 indicates equations obtained by substituting coordinates −4, −2, 0, 2, and 4 for x in Equation 2, and by substituting the average values AVG00, AVG01, AVG02, AVG03, and AVG04 corresponding to respective coordinates for y in Equation 2.

$$\begin{cases} AVG00 = coef0 \times (-4)^4 + coef1 \times (-4)^3 + \\ coef2 \times (-4)^2 + coef3 \times (-4)^1 + coef4 \\ AVG01 = coef0 \times (-2)^4 + coef1 \times (-2)^3 + \\ coef2 \times (-2)^2 + coef3 \times (-2)^1 + coef4 \\ AVG02 = coef0 \times (0)^4 + coef1 \times (0)^3 + \\ coef2 \times (0)^2 + coef3 \times (0)^1 + coef4 \\ AVG03 = coef0 \times (2)^4 + coef1 \times (2)^3 + \\ coef2 \times (2)^2 + coef3 \times (2)^1 + coef4 \\ AVG04 = coef0 \times (4)^4 + coef1 \times (4)^3 + \\ coef2 \times (4)^2 + coef3 \times (4)^1 + coef4 \end{cases} \quad (3)$$

When Equation 3 is represented by a matrix, Equation 4 may be obtained.

$$\begin{bmatrix} (-4)^4 & (-4)^3 & (-4)^2 & (-4)^1 & 1 \\ (-2)^4 & (-2)^3 & (-2)^2 & (-2)^1 & 1 \\ (0)^4 & (0)^3 & (0)^2 & (0)^1 & 1 \\ (2)^4 & (2)^3 & (2)^2 & (2)^1 & 1 \\ (4)^4 & (4)^3 & (4)^2 & (4)^1 & 1 \end{bmatrix} \begin{bmatrix} coef0 \\ coef1 \\ coef2 \\ coef3 \\ coef4 \end{bmatrix} = \begin{bmatrix} AVG00 \\ AVG01 \\ AVG02 \\ AVG03 \\ AVG04 \end{bmatrix} \quad (4)$$

When the inverse matrix of the matrix related to the coordinates included in Equation 4 is multiplied by both sides of Equation 4, Equation 5 may be obtained.

$$\begin{bmatrix} (-4)^4 & (-4)^3 & (-4)^2 & (-4)^1 & 1 \\ (-2)^4 & (-2)^3 & (-2)^2 & (-2)^1 & 1 \\ (0)^4 & (0)^3 & (0)^2 & (0)^1 & 1 \\ (2)^4 & (2)^3 & (2)^2 & (2)^1 & 1 \\ (4)^4 & (4)^3 & (4)^2 & (4)^1 & 1 \end{bmatrix}^{-1} \begin{bmatrix} AVG00 \\ AVG01 \\ AVG02 \\ AVG03 \\ AVG04 \end{bmatrix} = \begin{bmatrix} coef0 \\ coef1 \\ coef2 \\ coef3 \\ coef4 \end{bmatrix} \quad (5)$$

The guide image generator 120 may acquire the coefficients coef0, coef1, coef2, coef3, and coef4 using Equation 5. The guide image generator 120 may acquire the fitting curve (Equation 2) passing through the average values AVG00, AVG01, AVG02, AVG03, and AVG04 included in the first row based on the acquired coefficients coef0, coef1, coef2, coef3, and coef4.

The guide image generator 120 may calculate y values corresponding to coordinates (−5, 0), (−3, 0), (−1, 0), (1, 0), (3, 0), and (5, 0) using the fitting curve corresponding to Equation 2. For example, the guide image generator 120 may acquire a y value (e.g., a pixel value included in the first guide image 415) corresponding to coordinates (1, 0) by substituting x=1 into Equation 2 corresponding to the fitting curve.

In relation to FIG. 5, although description has been made based on the first row of the first average value set 410, the guide image generator 120 may apply the method described in FIG. 5 to other average values included in the first average value set 410.

The guide image generator 120 may acquire a first guide image 415 having a resolution that is four times higher than that of the first average value set 410 using the fitting curve (e.g., Equation 2) of the first average value set 410. For example, the guide image generator 120 may acquire the first guide image 415 having a horizontal length and a vertical length that are twice longer than those of the first average value set 410. The first guide image 415 may have resolution matching that of the image data 400.

Figure 6:
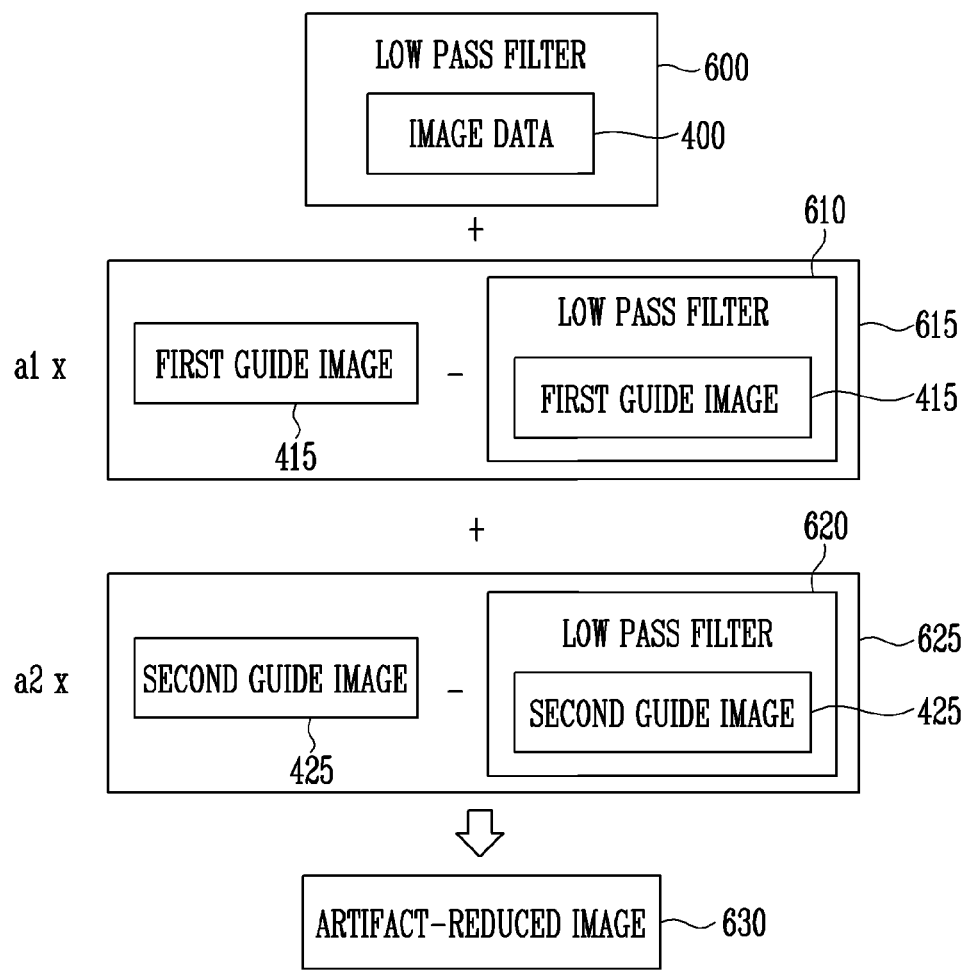
FIG. 6 is a diagram illustrating a method in which an image processor acquires a result image in which artifacts are reduced compared to image data using guide images according to an embodiment of the present disclosure.

FIG. 6 is a diagram illustrating a method in which an image processor acquires a result image in which artifacts are reduced compared to image data using guide images according to an embodiment of the present disclosure.

The image operating component 130 may generate an image 630 in which artifacts are reduced compared to image data 400 using a high-frequency component included in a guide image. In an example, the image operating component 130 may acquire the image 630 in which artifacts are reduced compared to the image data 400 by adding a first high-frequency component 615 included in a first guide image 415 to the image data 400. In an example, the image operating component 130 may generate the artifact-reduced image 630 by adding at least one of the first high-frequency component 615 included in the first guide image 415 or a second high-frequency component 625 included in a second guide image 425 to the image data 400. In the present disclosure, the artifact-reduced image 630 may be referred to as a "result image."

Referring to FIG. 6, the image operating component 130 may acquire blurred image data 600 by applying a low pass filter to the image data 400. For example, the image operating component 130 may perform mean filtering by applying a kernel to the image data 400.

As described above with reference to FIG. 2, the image data 400 may include artifacts attributable to a phase difference. Therefore, the image operating component 130 may acquire the blurred image data 600 in which artifacts attributable to a phase difference are removed while maintaining the entire format of the image data 400 by applying the low pass filter to the image data 400. However, the image operating component 130 may generate the artifact-reduced image 630 by adding the high-frequency component (e.g., the first high-frequency component 615 and/or the second high-frequency component 625) to the blurred image data 600, to maximally maintain the high-frequency component included in the image data 400 while minimizing the artifacts in the image data 400.

The image operating component 130 may acquire a blurred guide image 610 or 620 by applying the low pass filter (e.g., a mean filter) to the guide image (e.g., 415 or 425), and may acquire the high-frequency component (e.g., 615 or 625) included in the guide image 415 or 425 by subtracting the blurred guide image (e.g., 610 or 620) from the guide image (e.g., 415 or 425). For example, the image operating component 130 may acquire the first high-frequency component 615 included in the first guide image 415 by subtracting the first guide image 610, to which the low pass filter is applied, from the first guide image 415. Further, the image operating component 130 may acquire the second high-frequency component 625 included in the second guide image 425 by subtracting the second guide image 620, to which the low pass filter is applied, from the second guide image 425.

Because the first guide image 415 and the second guide image 425 are generated by calculating the averages of pieces of pixel data in different diagonal directions, they may have more textures in different directions. For example, the first guide image 415 may preserve more textures in a direction from a top-left portion to a bottom-right portion, that is, in a negative-slope direction '\', among textures contained in the image data 400, than the second guide image 425. Further, the second guide image 425 may preserve more textures in a direction from a top-right portion to a bottom-left portion, that is, in a positive-slope direction '\', among the textures contained in the image data 400, than the first guide image 415. Therefore, the image operating component 130 may acquire the artifact-reduced image 630 having better quality by utilizing the first high-frequency component 615 of the first guide image 415 and the second high-frequency component 625 of the second guide image 425 either selectively or together.

The image operating component 130 may generate the artifact-reduced image 630 based on a first weight a1 related to the first guide image 415 and a second weight a2 related to the second guide image 425. For example, the image operating component 130 may generate the artifact-reduced image 630 by adding a value, which is obtained by multiplying the first weight a1 by the first high-frequency component 615, and a value, which is obtained by multiplying the second weight a2 by the second high-frequency component 625, to the blurred image data 600.

The image operating component 130 may determine the first weight a1 and the second weight a2 using various schemes. The image operating component 130 may set a weight related to a guide image more similar to the image data 400 between the first guide image 415 and the second guide image 425, to a higher value.

In an example, the image operating component 130 may determine the first weight a1 based on a similarity between the first guide image 415 and the image data 400, and may determine the second weight a2 based on a similarity between the second guide image 425 and the image data 400. The following Equation 6 shows the weights (e.g., a1 and a2) determined based on the similarities between the guide images (e.g., 415 and 425) and the image data 400.

$$a1 = \frac{1}{2} \frac{\text{Covariance}(\text{Int}p_G, \text{Guide}_1)}{\text{Variance}(\text{Guide}_1)}; \quad (6)$$

$$a2 = \frac{1}{2} \frac{\text{Covariance}(\text{Int}p_G, \text{Guide}_2)}{\text{Variance}(\text{Guide}_2)}$$

In an example, the image operating component 130 may adaptively determine the weights (e.g., a1 and a2) so that the high-frequency component (e.g., 615 or 625) of the guide image (e.g., 415 or 425) more similar to the image data 400 between the first guide image 415 and the second guide image 425 can be added more to the image data 400. The following Equation 7 shows the adaptively determined weights (e.g., a1 and a2).

$$a1 = \frac{\text{Covariance}(\text{Int}p_G, \text{Guide}_1)}{\text{Variance}(\text{Guide}_1) + \text{Variance}(\text{Guide}_2)}; \quad (7)$$

$$a2 = \frac{\text{Covariance}(\text{Int}p_G, \text{Guide}_2)}{\text{Variance}(\text{Guide}_1) + \text{Variance}(\text{Guide}_2)}$$

In an example, the image operating component 130 may adaptively determine the weights (e.g., a1 and a2) so that only the high-frequency component (e.g., 615 or 625) of the guide image (e.g., 415 or 425) more similar to the image data 400 between the first guide image 415 and the second guide image 425 can be selectively added to the image data 400. The following Equation 8 shows the selectively determined weights (e.g., a1 and a2).

$$a1' = \frac{\text{Covariance (Int}p_G, \text{Guide}_1)}{\text{Variance (Guide}_1)};$$

$$a2' = \frac{\text{Covariance (Int}p_G, \text{Guide}_2)}{\text{Variance (Guide}_2)}$$

If $(a1' > a2') \{a1 = a1', a2 = 0\}$; else $\{a1 = 0, a2 = a2'\}$

In Equations 6 to 8, Covariance may denote a covariance operation. Variance may denote a variance operation. $\text{Int}p_G$ may denote the image data 400, $\text{Guide}_1$ may denote the first guide image 415, and $\text{Guide}_2$ may denote the second guide image 425. Furthermore, in addition to the schemes described in Equations 6 to 8, the image operating component 130 may determine the first weight a1 and the second weight a2 using various schemes.

The image operating component 130 may acquire the artifact-reduced image 630 through the scheme described with reference to FIG. 6. In the present disclosure, the artifact-reduced image 630 may be an image in which artifacts attributable to a phase difference, included in at least a partial area of the image data 400, are reduced. Furthermore, the image operating component 130 may add at least one of the first high-frequency component 615 or the second high-frequency component 625 to the blurred image data 600, thus acquiring the artifact-reduced image 630 in which a high-frequency component included in the image data 400 is maintained (e.g., definition or sharpness is maintained) while reducing artifacts attributable to a phase difference compared to the image data 400.

Figure 7:
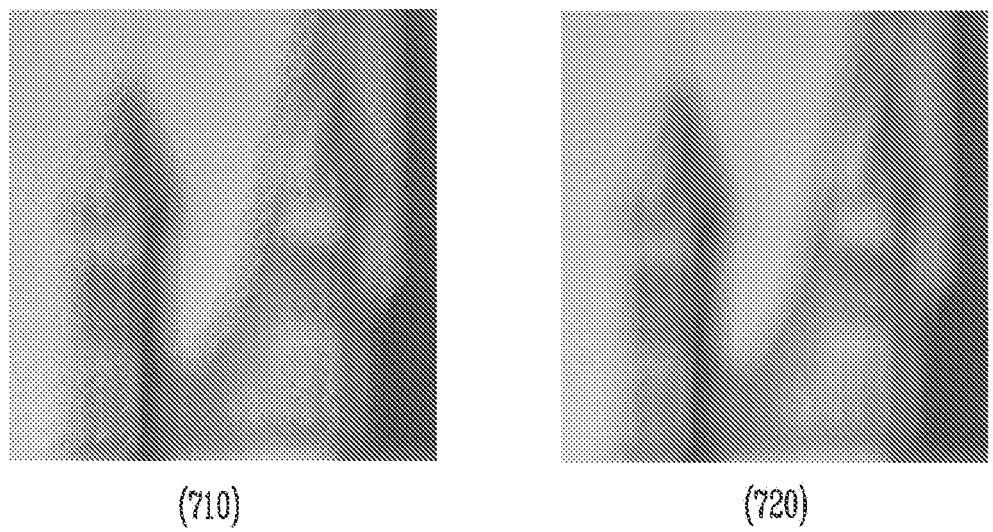
FIG. 7 is a diagram illustrating an example of a result image in which artifacts attributable to a phase difference are reduced according to an embodiment of the present disclosure.

FIG. 7 is a diagram illustrating an example of a result image in which artifacts attributable to a phase difference are reduced according to an embodiment of the present disclosure.

Referring to FIG. 2, the image processor 100 may receive raw data from the image sensor 200, and may generate and output an artifact-reduced RGB image through image processing according to the present disclosure. Reference numeral 710 in FIG. 7 may indicate an example of an image corresponding to the raw data, and reference numeral 720 may indicate an example of the artifact-reduced RGB image. Comparing reference numeral 710 with reference numeral 720, reference numeral 710 may include artifacts attributable to a phase difference in an out-of-focus area, and reference numeral 720 may not include artifacts attributable to a phase difference even in an out-of-focus area. By utilizing the schemes described in FIGS. 1 to 6, the image processor 100 may acquire the image corresponding to reference numeral 720 in which artifacts attributable to a phase difference are reduced compared to the image corresponding to reference numeral 710.

Figure 8:
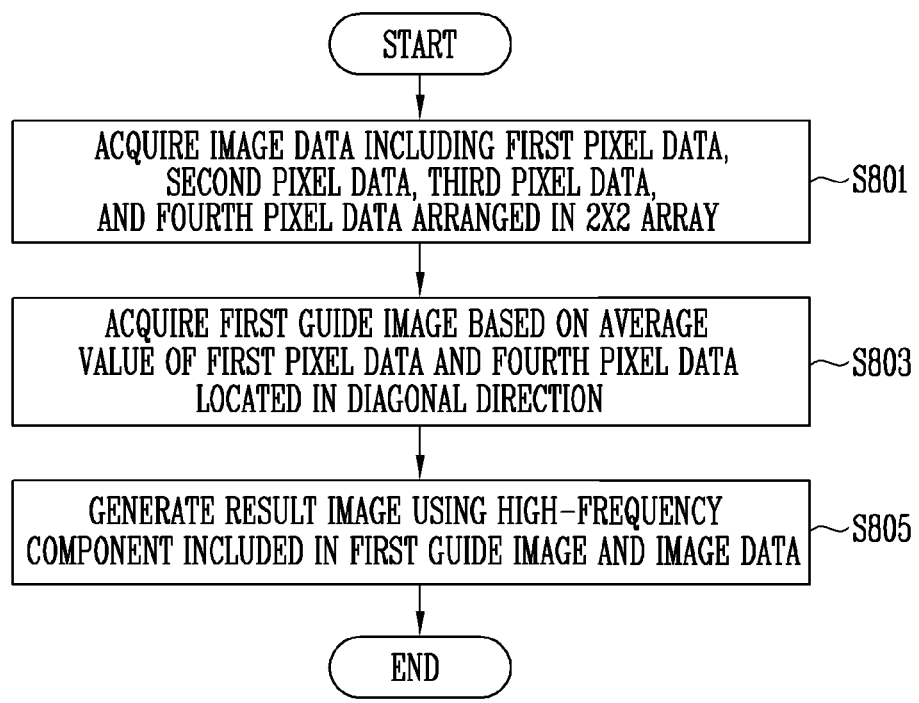
FIG. 8 is a flowchart illustrating a method of acquiring an artifact-reduced result image according to an embodiment of the present disclosure.

FIG. 8 is a flowchart illustrating a method of acquiring an artifact-reduced result image according to an embodiment of the present disclosure. It may be understood that steps described in FIG. 8 are performed by the image processor 100 of FIG. 1 or 2 or by components (e.g., 110, 120, and 130) included in the image processor 100.

At step S801, the image processor 100 (e.g., the acquirer 110) may acquire image data 400 including first pixel data 401, second pixel data 402, third pixel data 403, and fourth pixel data 404, which are arranged in a 2×2 array.

At step S803, the image processor 100 (e.g., the guide image generator 120) may acquire a first guide image 415 based on the average value 411 of the first pixel data 401 and the fourth pixel data 404 that are located in a diagonal direction.

At step S805, the image processor 100 (e.g., the image operating component 130) may generate a result image (e.g., the image 630 in which artifacts are reduced compared to the image data 400) using a high-frequency component (e.g., the first high-frequency component 615), included in the first guide image 415, and the image data 400.

FIG. 9 is a flowchart illustrating a detailed method of acquiring an artifact-reduced result image according to an embodiment of the present disclosure. It may be understood that steps described in FIG. 9 are performed by the image processor 100 of FIG. 1 or 2 or by components (e.g., 110, 120, and 130) included in the image processor 100.

At step S901, the image processor 100 (e.g., the receiver 112) may receive raw data from the image sensor 200.

At step S903, the image processor 100 (e.g., the G interpolator 114) may acquire image data 400 through G interpolation.

At step S905, the image processor 100 (e.g., the image operating component 130) may acquire blurred image data 600 by applying a low pass filter to the image data 400. Step S905 may be performed independently of steps S907 and S909, and the order of performance of the steps is not limited thereto.

At step S907, the image processor 100 (e.g., the guide image generator 120) may acquire a first guide image 415 and/or a second guide image 425 based on the average value of pieces of pixel data (e.g., the first pixel data 401 and the fourth pixel data 404 or second pixel data 402 and third pixel data 403) included in the image data 400.

At step S909, the image processor 100 (e.g., the image operating component 130) may acquire a first high-frequency component 615 included in the first guide image 415, and/or acquire a second high-frequency component 625 included in the second guide image 425.

At step S911, the image processor 100 (e.g., the image operating component 130) may add the first high-frequency component 615 and/or the second high-frequency component 625 to the blurred image data 600.

At step S913, the image processor 100 (e.g., the image operating component 130) may generate a result image (e.g., an artifact-reduced image 630).

At step S915, the image processor 100 (e.g., the R/B interpolator 140) may generate an artifact-reduced RGB image (e.g., 720) through R or B interpolation.

According to the present disclosure, a device including an A4C sensor may reduce artifacts (e.g., artifacts attributable to a phase difference) included in an image captured through image processing. Further, the device may maximally maintain details included in a captured image while reducing artifacts attributable to a phase difference.

What is claimed is:

1. An image processor, comprising:
   an acquirer configured to acquire image data including first pixel data, second pixel data, third pixel data, and fourth pixel data arranged in a 2×2 array;
   a guide image generator configured to acquire a first guide image based on an average value of the first pixel data and the fourth pixel data that are located in a diagonal direction; and
   an image operating component configured to acquire blurred image data by applying a low pass filter to the image data, and output a result image generated by adding a high-frequency component included in the first guide image to the blurred image data.

2. The image processor according to claim 1, wherein the guide image generator is configured to generate a second guide image based on an average value of the second pixel data and the third pixel data that are located in a diagonal direction.

3. The image processor according to claim 2, wherein the image operating component is configured to generate the result image using at least one of a first high-frequency component included in the first guide image or a second high-frequency component included in the second guide image.

4. The image processor according to claim 3, wherein the image operating component is configured to generate the result image based on a first weight related to the first guide image and a second weight related to the second guide image.

5. The image processor according to claim 4, wherein the image operating component is configured to set a weight related to a guide image that is more similar to the image data between the first guide image and the second guide image to a higher value.

6. The image processor according to claim 1, wherein the guide image generator is configured to:
acquire a first average value set including the average value of the first pixel data and the fourth pixel data based on the image data, and
acquire the first guide image having a resolution higher than that of the first average value set using a fitting curve of the first average value set.

7. The image processor according to claim 1, wherein the image operating component is configured to acquire the high-frequency component included in the first guide image by subtracting a first guide image to which a low pass filter is applied from the first guide image.

8. The image processor according to claim 1, wherein the result image is an image in which an artifact attributable to a phase difference included in at least a partial area of the image data is reduced compared to the image data.

9. An image processing method, comprising:
acquiring image data including first pixel data, second pixel data, third pixel data, and fourth pixel data arranged in a 2×2 array;
acquiring a first guide image based on an average value of the first pixel data and the fourth pixel data that are located in a diagonal direction;
acquiring blurred image data by applying a low pass filter to the image data; and
generating a result image by adding a high-frequency component included in the first guide image to the blurred image data.

10. The image processing method according to claim 9, further comprising:
acquiring a second guide image based on an average value of the second pixel data and the third pixel data that are located in a diagonal direction.

11. The image processing method according to claim 10, wherein generating the result image comprises:
generating the result image using at least one of a first high-frequency component included in the first guide image or a second high-frequency component included in the second guide image.

12. The image processing method according to claim 11, wherein generating the result image further comprises:
generating the result image based on a first weight related to the first guide image and a second weight related to the second guide image.

13. The image processing method according to claim 12, wherein generating the result image further comprises:
setting a weight related to a guide image that is more similar to the image data between the first guide image and the second guide image to a higher value.

14. The image processing method according to claim 9, wherein acquiring the first guide image comprises:
acquiring a first average value set including the average value of the first pixel data and the fourth pixel data based on the image data; and
acquiring the first guide image having a resolution higher than that of the first average value set using a fitting curve of the first average value set.

15. The image processing method according to claim 9, wherein generating the result image further comprises:
acquiring the high-frequency component included in the first guide image by subtracting a first guide image to which a low pass filter is applied from the first guide image.

16. The image processing method according to claim 9, wherein the result image is an image in which an artifact attributable to a phase difference included in at least a partial area of the image data is reduced.

* * * * *